United States Patent [19]
Marchesani et al.

[11] Patent Number: 5,883,551
[45] Date of Patent: Mar. 16, 1999

[54] QUADRATURE MODULATOR MALFUNCTION ESTIMATOR AND MODULATOR STAGE USING IT

[75] Inventors: Rossano Marchesani, Chieti, Italy; Jean-Xavier Canonici, Neuilly-sur-Seine, France

[73] Assignee: Alcatel Alsthom Compagnie Generale D'Electricite, Paris, France

[21] Appl. No.: 969,154

[22] Filed: Nov. 12, 1997

[30] Foreign Application Priority Data

Nov. 14, 1996 [FR] France .................................. 96 13868

[51] Int. Cl.⁶ .................................................. H04L 27/20
[52] U.S. Cl. .......................... 332/103; 332/123; 332/162; 375/296; 375/298; 455/126
[58] Field of Search ..................... 332/103, 104, 332/105, 123, 162; 375/261, 285, 296, 298; 455/63, 126

[56] References Cited

U.S. PATENT DOCUMENTS

| | | | |
|---|---|---|---|
| 4,930,141 | 5/1990 | Ohmagari | 332/103 |
| 5,054,037 | 10/1991 | Martineau et al. | 332/103 |
| 5,351,016 | 9/1994 | Dent | 332/103 |
| 5,663,691 | 9/1997 | Kowalik et al. | 332/103 |

FOREIGN PATENT DOCUMENTS

0379114A1  7/1990  European Pat. Off.
0722238A1  7/1996  European Pat. Off.

*Primary Examiner*—Siegfried H. Grimm
*Attorney, Agent, or Firm*—Sughrue, Mion, Zinn, Macpeak & Seas, PLLC

[57] ABSTRACT

A quadrature modulator including two mixers to which two carrier signals are applied and to each of which a modulating signal is applied, output signals of the mixers being applied to a combiner to constitute a modulated signal. A defect estimator for the modulator detects a first signal representative of the instantaneous power of the modulated signal, generates a second signal representative of a reference envelope obtained from the modulating signals, and corrects the amplitude of one of the first and second signals in accordance with the mean amplitude difference observed between this amplitude corrected signal and the other signal. A processor supplies from the observed amplitude difference between the amplitude corrected signal and the other signal, at least one signal relating to the defect.

10 Claims, 8 Drawing Sheets

QUADRATURE MODULATOR MALFUNCTION ESTIMATOR AND MODULATOR STAGE USING IT

BACKGROUND OF THE INVENTION

1. Field of the Invention

The field of the invention is that of transmitters of signals with $2^n$ phase states obtained by phase shift keying with M states or by amplitude and phase modulation with M states.

2. Description of the Prior Art

The invention is more precisely concerned with a malfunction estimator for a quadrature modulator including two mixers to which two carrier signals are applied and to each of which a modulating signal is applied, the output signals of the mixers being applied to a combiner to constitute a modulated signal. The carriers signals are in principle in phase quadrature and are either intermediate frequency signals or carrier frequency signals.

The invention concerns an estimator that can be used in a control loop to modify the phase difference between the carrier signals (quadrature estimator) and/or to eliminate residual unmodulated carrier signals in the modulated signal (residual carrier estimator) and/or to modify the amplitude of the output signals of the mixers (balance estimator for estimating the relative amplitude of the two channels). The invention is of particular benefit in monitoring a modulator stage operating in a wide band of frequencies and for high order modulation (high values of n).

In the case of modulation with $2^n$ phase states, if a Cartesian coordinate type representation in a signal space is required, the phase states can be uniformly distributed relative to axes corresponding to orthogonal carrier signals X and Y. There is obtained in this way a constellation that corresponds to the vector representation of the carrier signal states whose projections on the X and Y axes give the coordinates of the end of the vector represented.

However, a constellation can be off-center and/or phase-shifted relative to these axes, which degrades transmitter performance.

Figure 1:
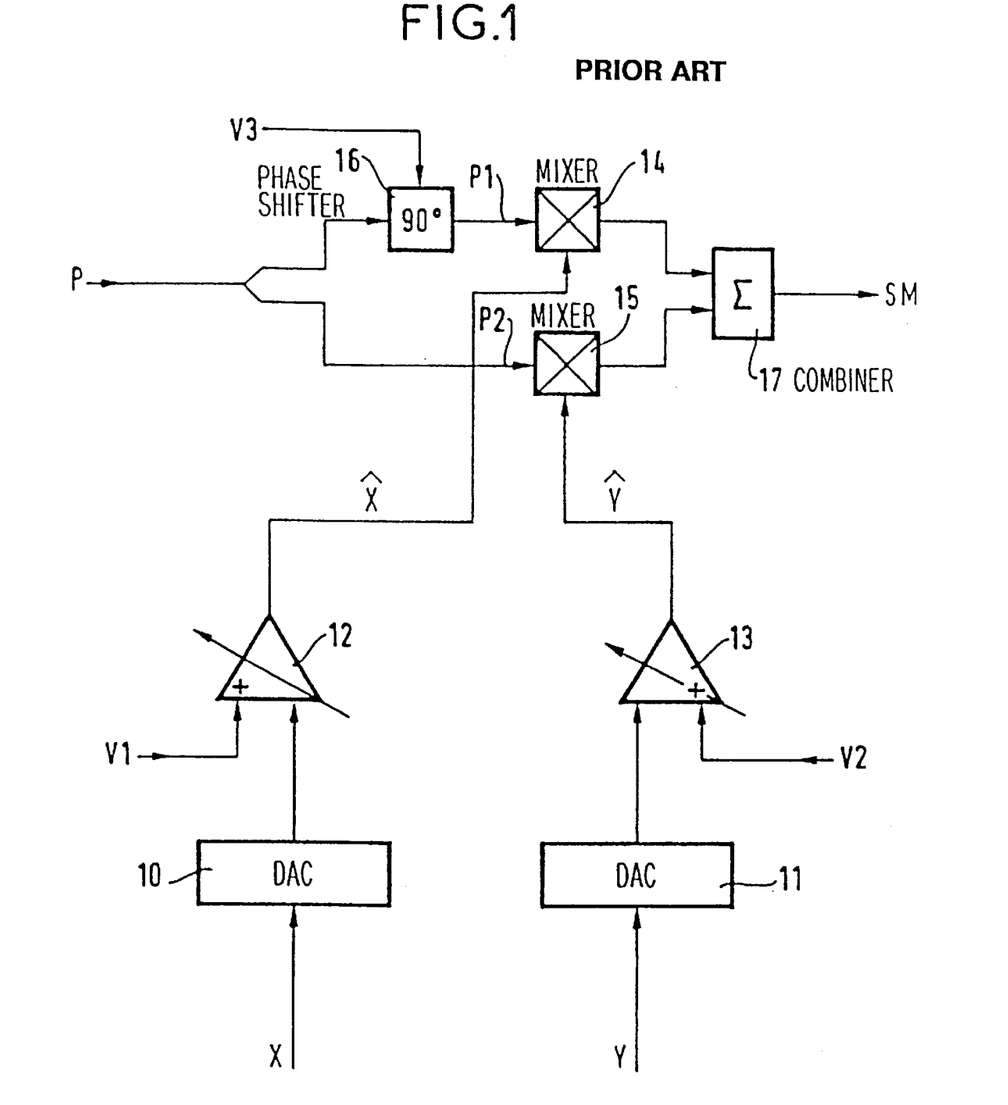
FIG. 1 shows a modulator stage of a prior art transmitter of signals with $2^n$ phase states.

FIG. 1 shows a modulator stage of a prior art transmitter of signals with $2^n$ phase states. A stage of this type is described in French patent No. 2 641 923 (U.S. Pat. No. 5,054,037).

Two modulating signals X and Y to be transmitted to a receiver are applied to digital/analog converters 10 and 11 the outputs of which are respectively connected to inputs of variable gain amplifiers 12 and 13 that receive on another input two control voltages V1 and V2. The output signals X̂, Ŷ of the amplifiers 12 and 13 constitute signals that are applied to two mixers 14 and 15 each receiving on their other port a carrier signal P1, P2, these carrier signals in principle having a relative phase of 90°. This relative phase angle can be adjusted by means of a voltage V3 applied to a variable 90° phase-shifter 16 receiving a carrier signal P from a local oscillator, like the mixer 15. The output signals of the mixers 14 and 15 are applied to a combiner 17 supplying a modulated signal SM to be transmitted with $2^n$ phase states. The signal SM can be an intermediate frequency signal or a microwave frequency signal.

Figure 2:
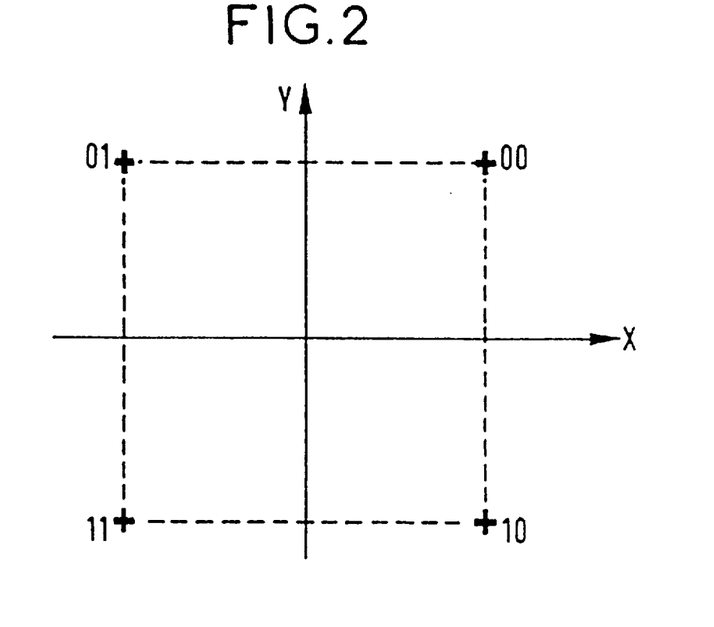
FIG. 2 shows an ideal constellation of a QPSK signal.

FIG. 2 shows the constellation of the signal SM. This signal corresponds to that of an ideal QPSK (Quaternary Phase Shift Keying) signal.

The crosses, corresponding to transmitted symbols, represent the various phase states of the signal SM. The constellation is centered, i.e. the projections of the vectors corresponding to the various states onto the X and Y axes are in pairs with the same amplitude and opposite phase.

Figure 3:
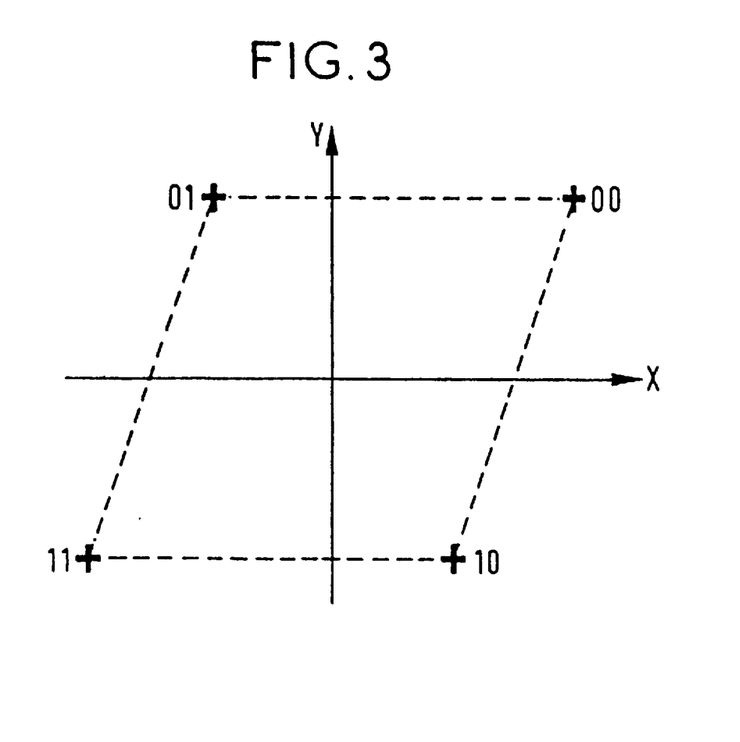
FIG. 3 shows a constellation of a QPSK modulated signal when the carrier signals are not in phase quadrature.

However, the phase quadrature relationship of the carrier signals applied to the FIG. 1 mixers may not be strictly complied with, these carrier signals then having a relative phase of $90° \pm \alpha$, where $\alpha$ corresponds to an unwanted angular offset. If any such angular offset exists, the constellation of the signal SM is as shown in FIG. 3, for example.

A quadrature error is due to a time-delay either between the carrier signal access paths or between the two modulated carrier signals. The quadrature error depends on the frequency of the carrier signal. The quadrature error renders the constellation asymmetrical which degrades the qualities of the transmission link between the transmitter equipped with the modulator stage and a receiver receiving the signal SM. The voltage V3 is used to compensate the quadrature error.

Figure 4:
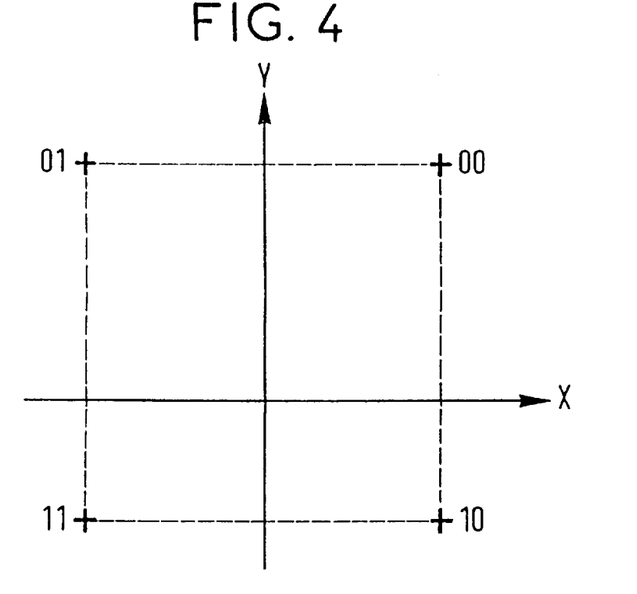
FIG. 4 shows a constellation of a QPSK modulated signal when the modulated signal includes residual carrier signals.

FIG. 4 shows a QPSK constellation of a signal SM from a modulator stage suffering from asymmetry of its mixers. Asymmetry of the mixers causes residual unmodulated carrier signals in the modulated signal and the energy is unequally distributed. The voltages V1 and V2 are modified to remedy this.

The function of a residual carrier signal estimator is to provide a signal for eliminating these carrier signals in the modulated signal. Conventionally, if the carrier signals are microwave (direct modulation) signals, the cooperation of the estimator and of the modulator eliminates the carrier in the transmitted signal. The device is then a carrier elimination device.

Generally speaking, residual carrier signals in the modulated signal gives rise to a line at the frequency of the carrier signals at the center of the modulated spectrum. This can be caused by:

an imbalance of the mixers, allowing a fraction of the carrier signals to pass for a modulating signal of 0 volt;

defective isolation of the mixer outputs from the local oscillator.

The patent mentioned above describes an estimator for preserving a constellation of the SM signal like that shown in FIG. 2.

The estimator described in the above patent application is of the digital type and takes account of the modulating signals X and Y and the modulated signal SM. The modulated signal SM is subjected to amplitude detection and is digitized for comparison with the signals X and Y. A microprocessor controls counters-downcounters followed by digital-analog converters the outputs of which constitute the control voltages V1 through V3.

However, the above estimator has a number of drawbacks:

as the processing is digital, a limitation is imposed by the maximal operating frequency of the microprocessor; correction of the constellation therefore takes some time;

the quantizing of the modulated signal SM by the analog-digital converter leads to a lack of precision and it is not possible to effect a very fine adjustment of the quadrature, for example;

the cost of analog-digital and digital-analog converters increases with the digital bit rate;

its implementation is complex;

it is designed to operate at a given digital bit rate, at a given carrier frequency and for a given type of generator.

French patent No. 2 729 261 (U.S. Pat. No. 5,663,691) describes a quadrature modulator malfunction estimator including two mixers to which two carrier signals are applied and to each of which a modulating signal is applied, the output signals of the mixers being applied to a combiner to constitute a modulated signal. This estimator includes:

means for detecting the instantaneous power of the modulated signal;

means for multiplying the detected instantaneous power by at least one of the modulating signals;

means for integrating the result of this multiplication, the integrator means supplying a signal indicative of the malfunction of the modulator.

If the modulator malfunction is residual carrier signals in the modulated signal, the multiplier means multiply the instantaneous power by each of the modulating signals to supply, after integration, two signals representative of the residual carrier signals in the modulated signal.

If the modulator malfunction is a quadrature error between the signals from the mixers, the multiplier means multiply the detected instantaneous power by the modulating signals to supply, after integration, a signal representative of the relative phase of the signals from the mixers.

One of the problems with the estimators described in the above patent application is that there convergence times to obtain an accurate estimate are long. In other words, the integration times are long.

Figure 5:
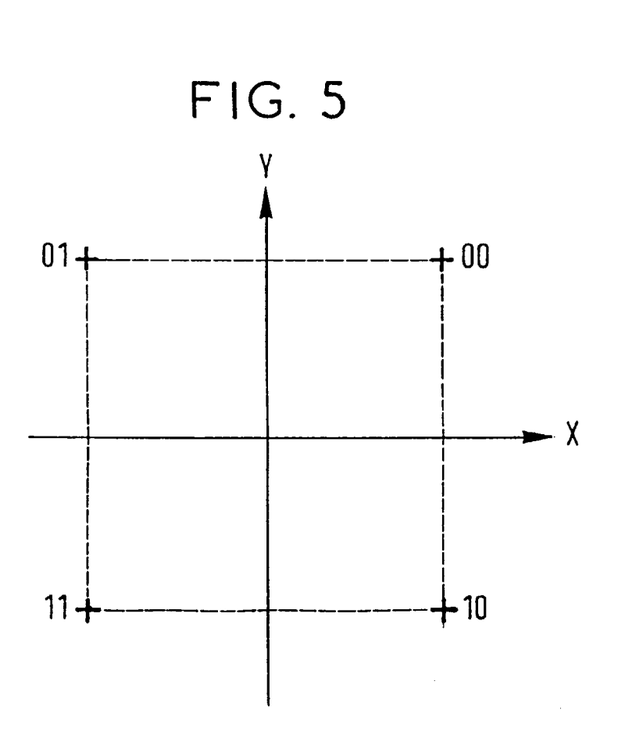
FIG. 5 shows a constellation of a QPSK modulated signal from a modulator with an imbalance.

Nor is there any provision for estimating the imbalance of the modulator. Accordingly, a constellation like that shown in FIG. 5, which is a constellation of a QPSK modulated signal from a modulator with imbalance (amplitude difference between the X and Y channels) cannot be corrected.

One object of the present invention is to remedy these drawbacks.

To be more precise, one object of the invention is to provide a fast estimator for estimating a malfunction of a quadrature modulator, the malfunction being residual carrier signals in the modulated signal or a quadrature error between the signals from the mixers or an imbalance. It must be possible to use the estimator in a quadrature modulator operating in a wide band of frequencies.

SUMMARY OF THE INVENTION

The above object, and others that will become apparent hereinafter, is achieved by a defect estimator for a quadrature modulator including two mixers to which two carrier signals are applied and to each of which a modulating signal is applied, output signals of said mixers being applied to a combiner to constitute a modulated signal, said estimator including:

means for detecting a first signal representative of the instantaneous power of said modulated signal;

means for generating a second signal representative of a reference envelope obtained from said modulating signals;

means for correcting the amplitude of one of said first and second signals in accordance with the mean amplitude difference observed between this amplitude corrected signal and the other signal; and processing means supplying, from the observed amplitude difference between said amplitude corrected signal and said other signal, at least one signal relating to said defect.

Thus the invention proposes to correct the envelope amplitude of the modulated signal in accordance with the modulating signals, for example, to circumvent a disparity in the distribution of the values of the modulating signals. In this way it is possible to reduce considerably the time to analyze the first signal and to correct the defect or defects of the quadrature modulator in a very short time.

If the modulator defect is a quadrature error, the processing means include means for multiplying the observed amplitude difference by the signs of the modulating signals, the multiplier means supplying, after integration, a quadrature error signal.

If the modulator defect is residual carrier signals in the modulated signal, the processing means include two multipliers each receiving the sign of one of the modulating signals, the output signals of the multipliers constituting, after integration, two signals each representative of the residuals of one of the carrier signals in the output signal of one of the mixers.

If the modulator defect is an imbalance, the observed amplitude difference is applied to two multipliers each of which also receives one of the modulating signals, the output signals of the multipliers being applied to absolute value circuits before their difference is calculated and then integrated, the integrated signal constituting an imbalance signal.

The invention also concerns a quadrature modulator cooperating with an estimator of the above kind.

Other features and advantages of the invention will become apparent from a reading of the following description of one preferred embodiment given by way of non-limiting illustrative example and from the accompanying drawings.

DETAILED DESCRIPTION OF THE PREFERRED EMBODIMENTS

FIGS. 1 through 5 have already been described with reference to the prior art. In the various figures, the same components carry the same reference symbols.

Figure 6:
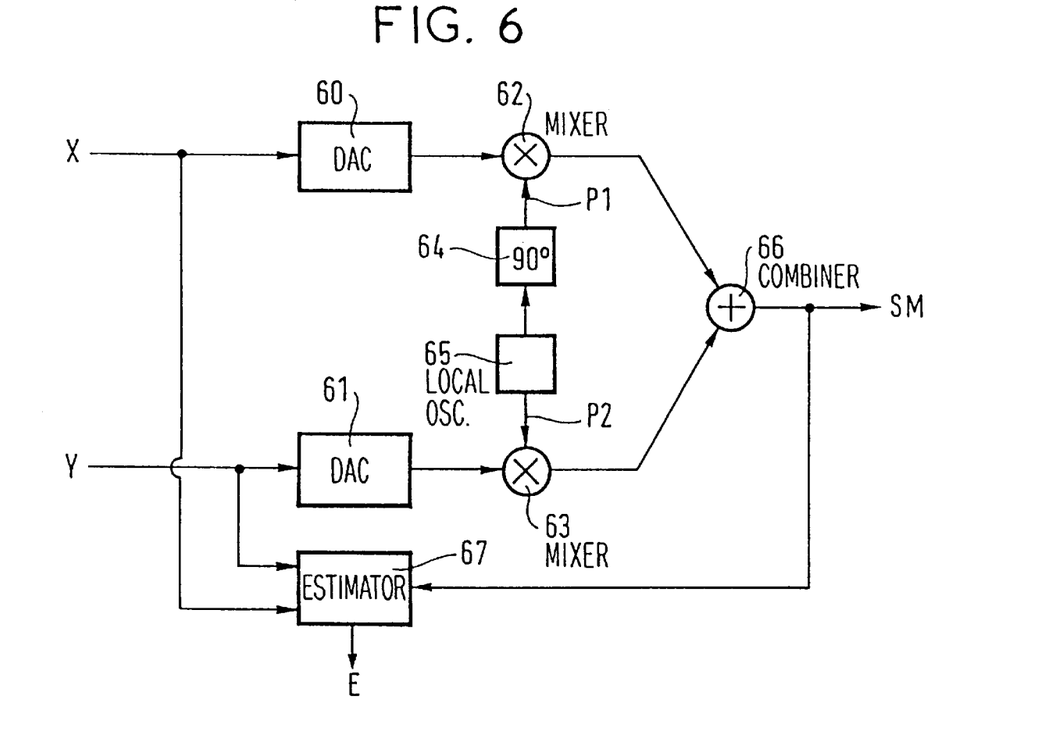
FIG. 6 shows a quadrature modulator that can be controlled by an estimator of the invention.

FIG. 6 shows a quadrature modulator that can be controlled by an estimator of the invention.

The modulating signals X and Y are conventionally applied to a modulator stage comprising digital/analog converters (DAC) 60, 61, the output signals of which are applied to mixers 62, 63 receiving carrier signals P1 and P2 that are ideally in phase quadrature. The carrier signals P1 and P2 are obtained by phase-shifting the output signal of a local oscillator 65 by 90° (phase-shifter 64). The output signals of the mixers 62, 63 are combined in a combiner 66 to constitute a modulated signal SM that is an intermediate frequency signal or a microwave frequency signal.

The quadrature modulator operates with an estimator unit 67 receiving the modulating signals X and Y and the modulated signal SM. As will become apparent hereinafter, the estimator unit 67 can include a quadrature defect estimator and/or a residual carrier estimator and/or an imbalance estimator.

For simplicity, the estimator unit 67 is deemed to include a single estimator supplying a signal E relating to the modulator defect. This signal E is usually applied to one of the units of the modulator in order to correct the defect concerned.

Figure 7:
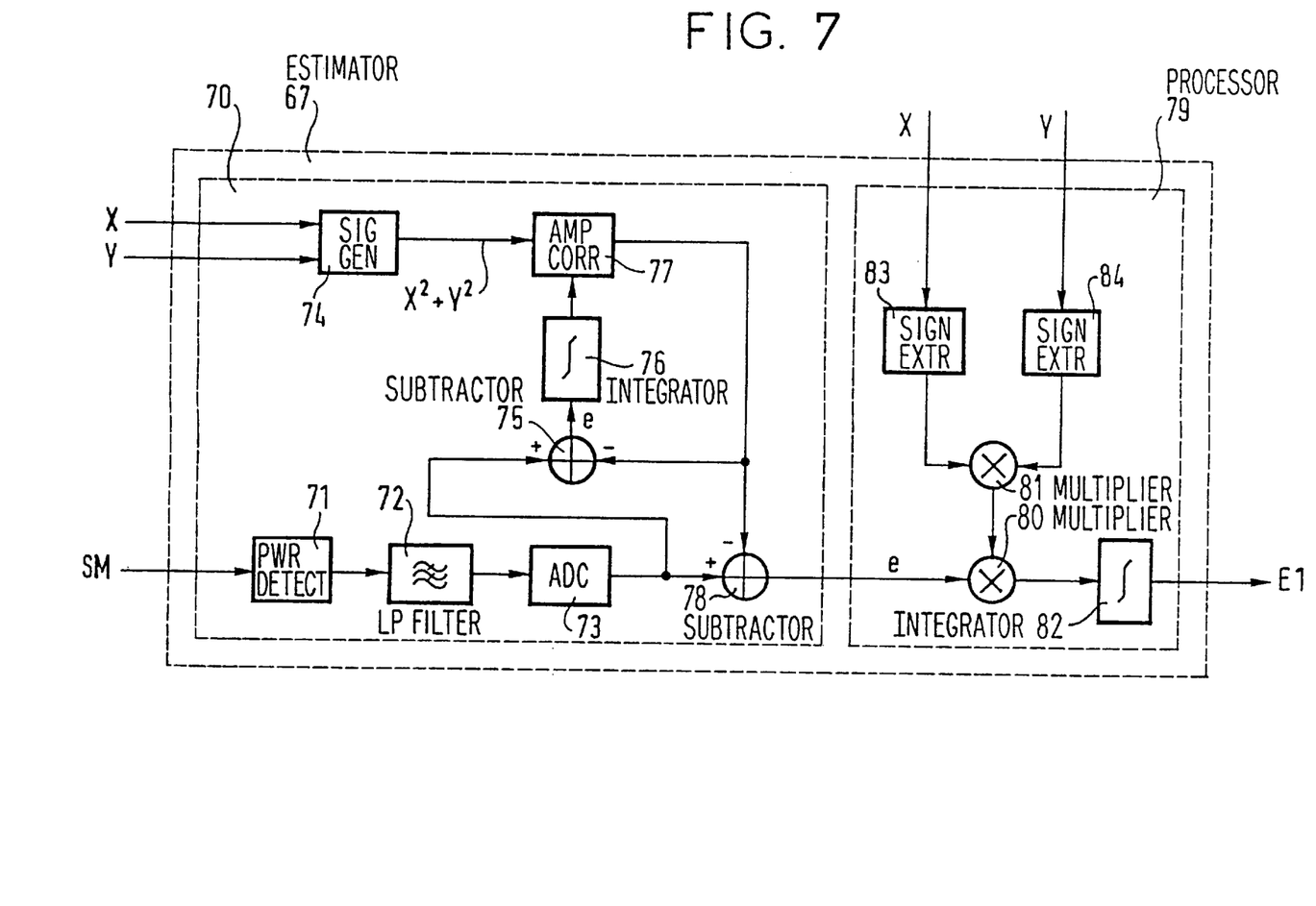
FIG. 7 shows one embodiment of a quadrature defect estimator of the invention.

It will firstly be assumed that the estimator in the unit 67 is a quadrature defect estimator. FIG. 7 shows one embodiment of an estimator of this kind.

Like the residual carrier estimator and the imbalance estimator to be described hereinafter, the quadrature defect estimator of the invention includes means 70, in this embodiment digital means 70, including:

means 71 for detecting a first signal representative of the instantaneous power of the modulated signal SM;

a low-pass filter 72 filtering the signal from the means 71;

an analog/digital converter 73 supplying a filtered digital signal that is also representative of the instantaneous power of the modulated signal SM;

means 74 for generating a second signal representative of a reference envelope obtained from the modulating signals X and Y;

means 77 for correcting the amplitude of one of the first and second signals (here correcting the amplitude of the second signal) in accordance with the mean amplitude difference (integrator 76) observed by a subtractor 75 between the amplitude corrected signal (from the corrector means 77) and the other signal (from the ADC 73).

The second signal has an amplitude equal to $X^2+Y^2$, for example.

The means 70 supply to processing means 79 an error signal $\underline{e}$ (identical to that applied to the input of the integrator 76) for the processing means to generate a signal E1 relating to the quadrature defect to be estimated.

The means 74 supply the envelope $\sqrt{X^2+Y^2}$ or the squared envelope $X^2+Y^2$, for example. Likewise, the means 71 supply a corresponding signal, the envelope of the modulated signal SM or the squared envelope, respectively. What is essential is that the first and second signals respectively represent an instantaneous power of the modulated signal SM and a reference envelope obtained from the modulating signals.

The function of the loop comprising the subtractor 75, the integrator 76 and the amplitude corrector means 77 is to assure that the amplitude of the signal from the means 77 is equal to that of the signal from the ADC 73 so that the error signal $\underline{e}$ from the means 70 is a null signal. Accordingly, the envelope of the signal to be transmitted is not conditioned by the statistical distribution of the signals X and Y and any amplitude differences are compensated.

In reality this loop is needed only if variations in component characteristics with time (aging) are to be compensated and/or the attenuation due to the circuits of the modulator and the means 71 through 74 is not known. This is why, for reasons of clarity, two subtractors 75 and 78 are shown, the practical implementation requiring only one subtractor.

In the absence of any such loop, only the means 78 subtracting the second signal from the first signal are needed, these means 78 then supplying a difference signal $\underline{e}$ directly to the processing means 79.

The amplitude correction means 77 can be implemented in the form of a variable gain amplifier controlled by the signal from the integrator 76, for example.

In the quadrature defect estimator of FIG. 7 the processing means 79 comprise multiplier means 80, 81 supplying to an integrator 82 the product of the error signal $\underline{e}$ and the signs on the modulating signals X and Y. To this end the modulating signals X and Y are applied to sign extractors 83, 84 supplying at their outputs the signs of the modulating signals X, Y. The integrator 82 is in fact an accumulator of a number $\mu$ of estimates and supplies the signal E1 representative of the quadrature error.

The amplitude of either the first signal (from the ADC 73) or the second signal (from the generator means 74) can be corrected.

The quadrature error signal E1 can be applied to the quadrature modulator as indicated in the aforementioned patent FR-2.729.261 (U.S. Pat. No. 5,663,691).

A mathematical justification for the foregoing is given hereinafter for the case of squared envelope calculations. It is assumed that the modulating signals X and Y are independent random variables (X=f1(t) and Y=f2(t)).

In the presence of a quadrature defect $\alpha$, there is at the output of the ADC 73:

$$\begin{aligned} P^2 &= (X^*\cos(\alpha))^2 + (X^*\sin(\alpha) + Y)^2 \\ &= X^2 + Y^2 + 2^*X^*Y^*\sin(\alpha) \end{aligned} \quad (1)$$

where P is the envelope.

By multiplying (at 80) this expression by sg(x)* sg(y), where sg is the sign, and calculating the mathematical expectation of the resulting signal, we obtain:

$$E[X^{2*}sg(X)]^*E[sg(Y)] + E[Y^{2*}sg(Y)]^*E[sg(X)] + \quad (2)$$
$$E[2^*X^*Y^*\sin(\alpha)^*sg(X)^*sg(Y)]$$

The first and second terms of this expression are present because $X^2+Y^2$ is present in equation (1). These terms cancel only after a long (in theory infinite) time. For a long analysis time of the signal $P^2$, E[sg(Y)] and E[sg(X)] converge towards zero. Thus only the third term of the expression remains. Equation (2) is then written:

$$2^*\sin(\alpha)^*E[|X|]^*E[|Y|]$$

since X* sg(X)=|X| and Y* sg(Y)=|Y| This expression converges faster because it is no longer necessary to wait for the terms in $X^2$ and $Y^2$ to converge to zero.

The function implemented in the invention thus consists in eliminating the value $X^2+Y^2$ in the expression for $P^2$ to enable a very fast estimate of the quadrature error $\alpha$. This principle is the same for imbalances and residual carriers, as will become apparent hereinafter.

Figure 8:
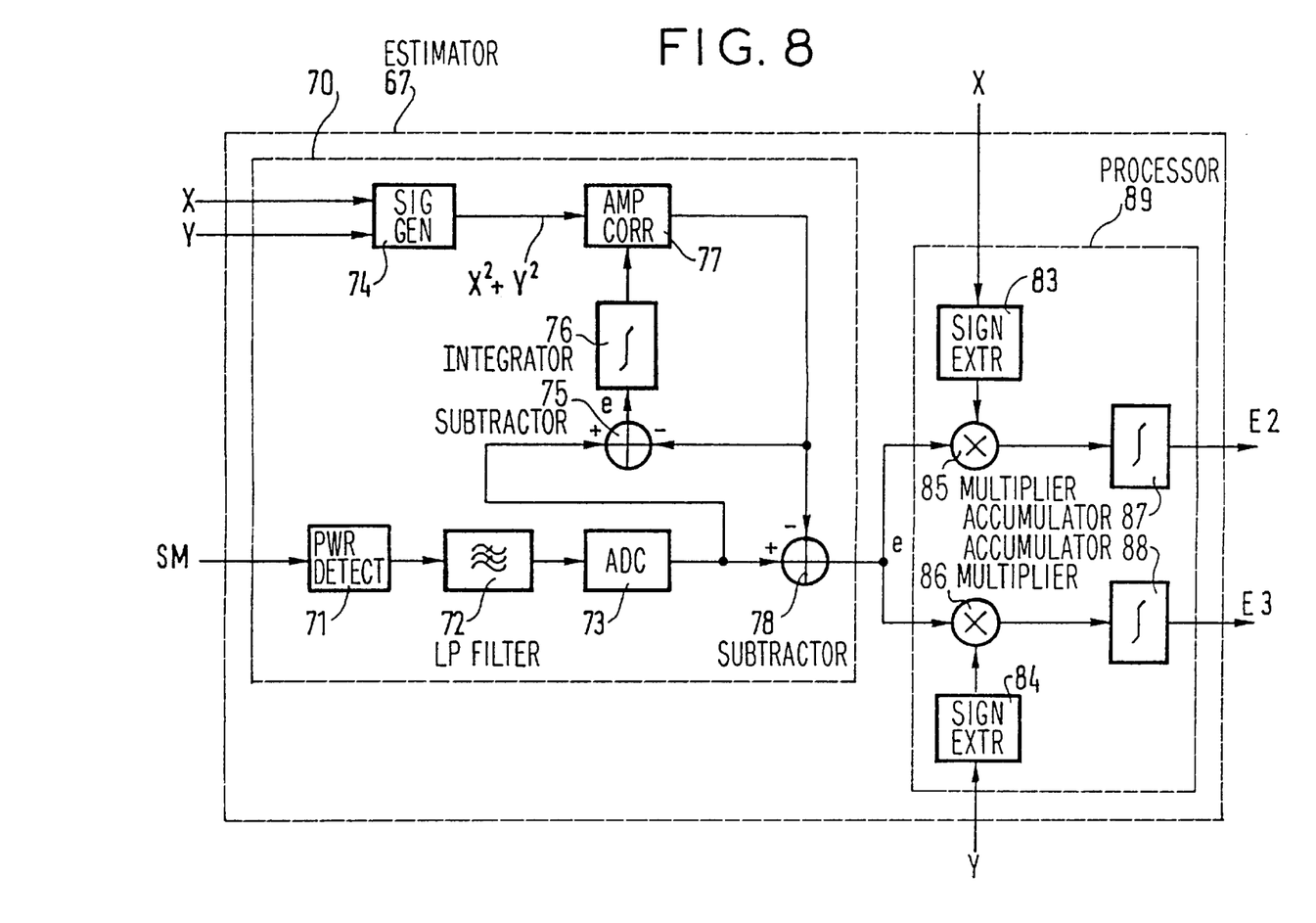
FIG. 8 shows one embodiment of a residual carrier estimator of the invention.

Next it is assumed that the estimator included in unit 67 in FIG. 6 is a residual carrier signal estimator. FIG. 8 shows one embodiment of an estimator of this kind.

The means 70 in FIG. 8 are identical to those in FIG. 7. Where it is required to estimate a quadrature error and residual carrier signals, the means 70 can therefore be shared between the estimators.

The error signal $\underline{e}$ is applied to processing means 89 including two multipliers 85, 86 each receiving the sign of one of the modulating signals X and Y via sign extractors 83 and 84. After accumulation of a number $\mu$ of estimates in the accumulators 87, 88, the output signals of the multipliers 85 and 86 constitute two signals E2, E3 each representative of residuals of one of the carrier signals in one of the output signals of one of the mixers 62, 63 (FIG. 6) of the quadrature modulator.

For the purposes of correction, the signals E2 and E3 can be applied to the mixers 62 and 63 (FIG. 6) to correct the offsets introduced by these mixers. They can be offset adjustment inputs, for example.

The mathematical justification for the foregoing is given below, also for the case of squared envelope calculations.

In the presence of a residual carrier $\chi$, there is at the output of the ADC 73:

$$p^2 = (X + \chi_x)^2 + (Y + \chi_y)^2 \quad (3)$$
$$= X^2 + Y^2 + 2*X*\chi_x + 2*Y*\chi_y + \chi_x^2 + \chi_y^2$$

where $\chi_x$ is the residual carrier at the output of the mixer of channel X (mixer 62 in FIG. 6) and $\chi_y$ is the residual carrier at the output of the mixer of channel Y (mixer 63).

Multiplying this expression by sg(X) and by sg(Y) and calculating the mathematical expectation yields:

$E[X^2*sg(X)] + E[Y^2]*E[sg(X)] + 2*\chi_x*E[X*sg(X)] +$ $\quad 2*\chi_y*E[Y]*E[sg(X)] + \chi_x^2*E[sg(X)] + \chi_y^2 \times *E[sg(X)]$ on one channel and $E[X^2]*E[sg(Y)] + E[Y^2*sg(Y)] + 2*\chi_x*E[X]*E[sg(Y)] +$ $\quad 2*\chi_y*E[Y*sg(Y)] + \chi_x^2*E[sg(Y)] + \chi_y^2*E[sg(Y)]$ on the other channel.

Removing the terms that cancel out after a long time (those due to the presence of $X^2$ plus $Y^2$ in equation (3)) we obtain:

$2*\chi_x*E[|X|]$ on one channel, and $2*\chi_y*E[|Y|]$ on the other channel.

Thus eliminating $X^2+Y^2$ in equation (3) using the means 74 through 78 produces an estimate of the residual carriers $\chi_x$ and $\chi_y$ much faster than in the prior art.

Figure 9:
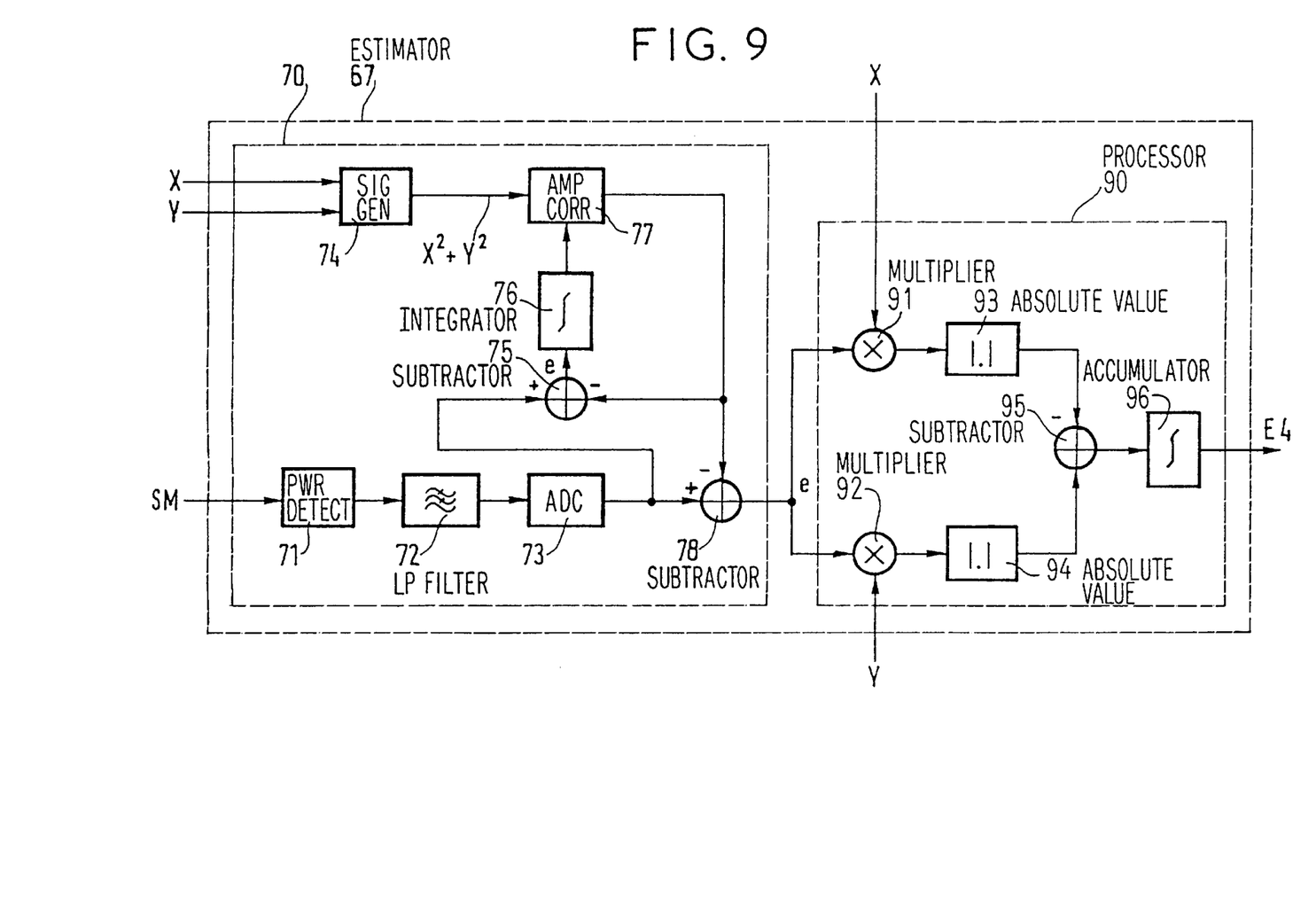
FIG. 9 shows one embodiment of an imbalance estimator of the invention.

Next it is assumed that the estimator in the unit 67 of FIG. 6 is an imbalance estimator. FIG. 9 shows one embodiment of an estimator of this kind.

The means 70 in FIG. 9 are also identical to those in FIG. 7, apart from the fact that the ADC 73 is an oversampling converter. To estimate an imbalance the envelope of the signal SM must be oversampled, for example at 8*Ts (where Ts is the symbol period) in order to obtain more than one sample per quadrant of the complex plane.

The error signal e is applied to processing means 90 including two multipliers 91, 92 receiving the signal e and each of the multipliers 91, 92 also receives one of the modulating signals X, Y. The output signals of the multipliers 91, 92 are applied to absolute value circuits 93, 94, the output signals of these circuits 93, 94 being applied to a subtractor 95. The resulting difference signal is applied to an accumulator 96 which accumulates a number α of estimates. The output of the accumulator 96 constitutes an imbalance signal E4.

To correct the balance of the quadrature modulator the signal E4 can be applied to a multiplier supplying to a combiner a signal X*E4 (or Y*E4), the combiner being inserted into the corresponding channel (X or Y) to supply to the modulator a combined signal equal to X*(1+E4) or Y*(1+E4). This combined signal then replaces the modulating signal X or Y, respectively.

The mathematical justification for the foregoing is given below, also for the case of squared envelope calculations.

In the presence of an imbalance β, there is at the output of the ADC 73:

$$P^2 = X^2 + ((1 + \beta)Y)^2 = X^2 + Y^2 + 2*\beta*Y + \beta^{2*}Y^2 \quad (4)$$

Multiplying this expression by |X| and by |Y| we obtain:

$X^{2*}|X| + Y^{2*}|X| + (2*\beta*Y^2 + \beta^{2*}Y^2)*|X|$
on one channel, and
$X^{2*}|Y| + Y^{2*}|Y| + (2*\beta*Y^{2*}|Y|) + \beta^{2*}Y^{2*}|Y|$
on the other channel.

Taking the difference between these expressions, and given that:

$E[X^2]*E[|Y|] = E[Y^2]*E[|X|]$
$E[X^{2*}|X|] = E[Y^{2*}|Y|]$
$E[Y]*E[|X|] = E[Y*|Y|] = 0$ we obtain:

$2*(\beta + \beta^2)*(E[Y^2]*E[|X|] - E[Y^{2*}|Y|])$

Once again, eliminating the term $X^2+Y^2$ in equation (4) estimates the imbalance β much faster than in the prior art.

Figure 10:
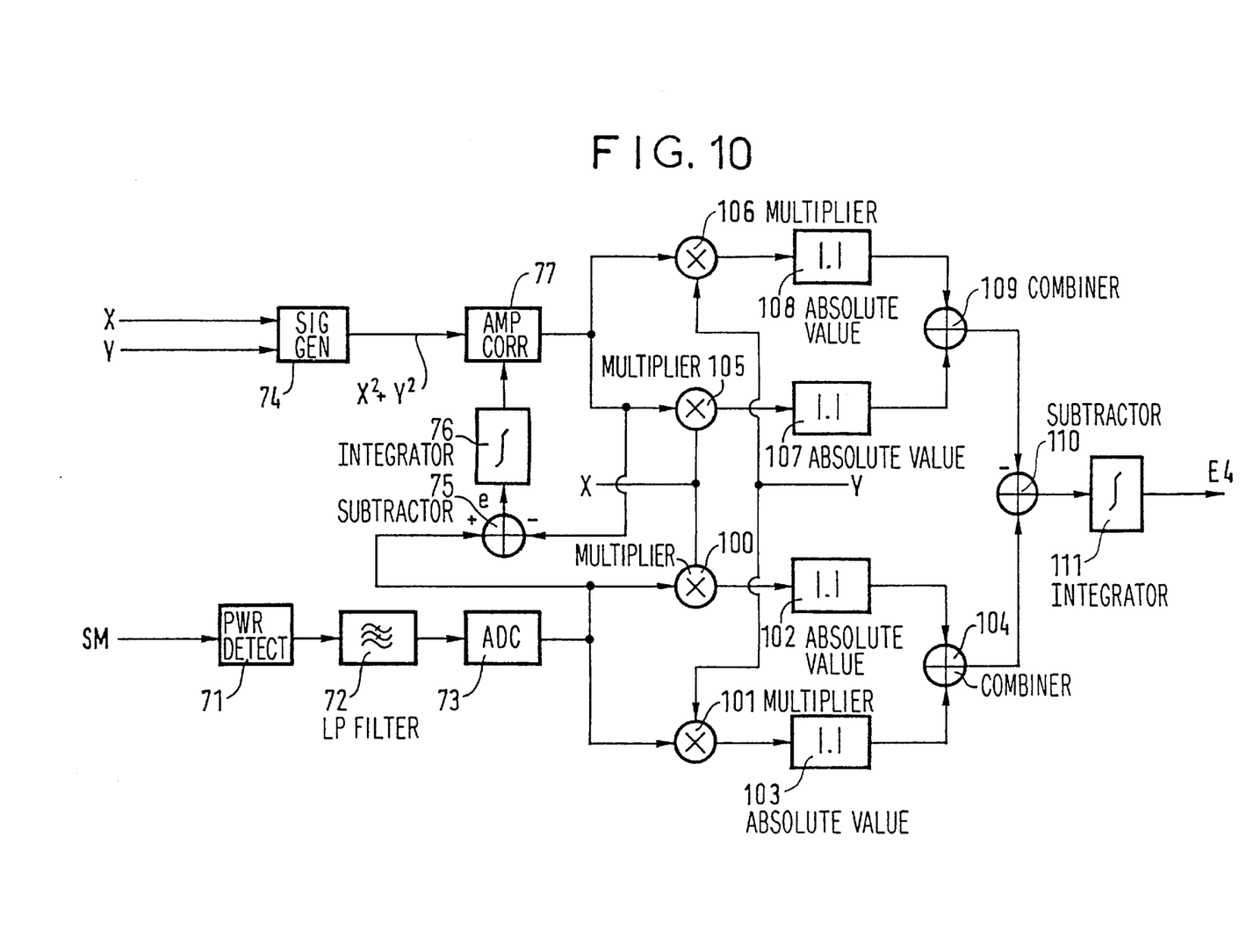
FIG. 10 shows a different embodiment of an imbalance estimator of the invention.

FIG. 10 shows a different embodiment of an imbalance estimator in accordance with the invention.

In this embodiment, equivalent to the FIG. 9 embodiment, the first signal representative of the instantaneous power of the modulated signal SM is applied to two multipliers 100 and 101 which also receive the modulating signals X and Y. The output signals of the multipliers 110, 101, are applied to absolute value circuits 102, 103 before they are combined in a combiner 104. In parallel with this, the second signal representative of a reference envelope (the amplitude of which has been corrected as previously indicated to circumvent a non-homogeneous statistical distribution of the data to be transmitted) is applied to two other multipliers 105, 106, to which the modulating signals X and Y are also applied. After the resulting products offered to the absolute value circuits 107, 108 and the absolute values obtained have been combined in a combiner 109, the output signal of the combiner 109 is subtracted by a subtractor 110 of that from the combiner 104 in order to obtain the same signal as that available at the output of the subtractor 95 in FIG. 9. After integration (at 111) the imbalance estimate E4 is obtained.

This variant embodiment can of course also be applied to the estimators from FIGS. 7 and 8.

Figure 11:
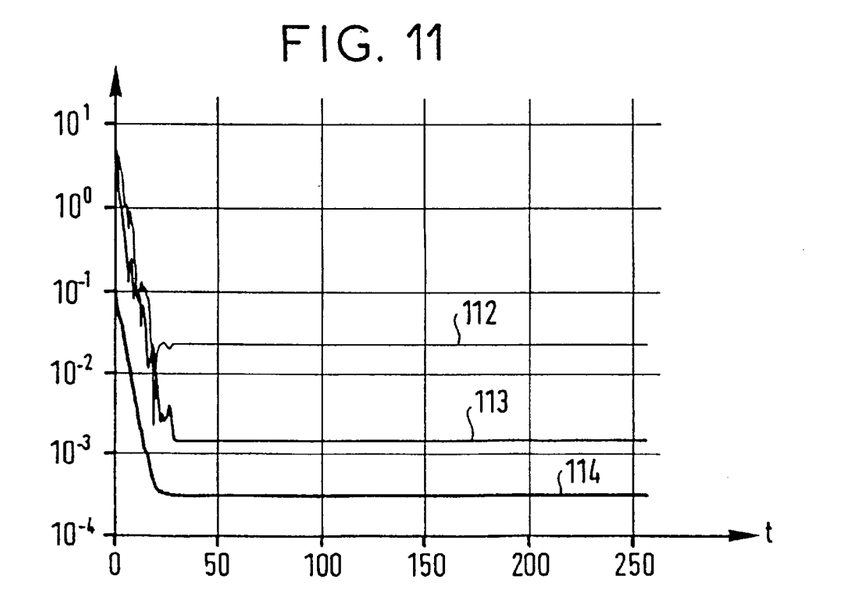
FIG. 11 shows imbalance, quadrature defect and residual carrier estimates as a function of time.

FIG. 11 shows the imbalance, quadrature defect and residual carrier estimates as a function of time t expressed in milliseconds. The characteristic 112 corresponds to the accuracy of the imbalance, expressed as a %, the characteristic 113 to the quadrature error and the characteristic 114 to the residual carrier signals.

It can be seen that the three defects are perfectly estimated and therefore corrected in a time period in the order of 30 ms (convergence time) for 500 Ts, where Ts is the symbol period. The values of μ (inversely proportional to Ts) are all integrated with a loop gain parameter of 0.01 and the ADC 73 has a resolution of 11 bits. The higher the value of μ and the greater the resolution of the ADC 73, the faster the convergence and the greater the accuracy.

The invention is preferably applied to a digital implementation, for example integrated into an ASIC, but an analog implementation is also feasible.

The estimators described above are more particularly intended to be associated with a modulator stage operating with a variable digital bit rate and with a variable carrier signal frequency. Of course, they are also highly beneficial in the case of a modulator operating at a fixed frequency, for compensating variations in modulator characteristics due to temperature variations or aging, for example.

The invention finds a particular application in modulators used in microwave beam and satellite transmission.

There is claimed:

1. A defect estimator for a quadrature modulator including two mixers to which two carrier signals are applied and to each of which a modulating signal is applied, output signals of said mixers being applied to a combiner to constitute a modulated signal, said estimator including:

means for detecting a first signal representative of the instantaneous power of said modulated signal;

means for generating a second signal representative of a reference envelope obtained from said modulating signals;

means for correcting the amplitude of one of said first and second signals in accordance with the mean amplitude difference observed between this amplitude corrected signal and the other signal; and processing means supplying, from the observed amplitude difference between said amplitude corrected signal and said other signal, at least one signal relating to said defect.

2. The estimator claimed in claim 1 wherein said signal whose amplitude is corrected is said second signal.

3. The estimator claimed in claim 1 wherein said modulator defect is a quadrature defect and said processing means include multiplier means for multiplying said observed amplitude difference by the signs of said modulating signals, said multiplier means supplying, after integration, a quadrature error signal.

4. The estimator claimed in claim 1 wherein said modulator defect is residual carrier signals in said modulated signal and said processing means include two multipliers each multiplying said observed amplitude difference by the sign of one of said modulating signals, the output signals of said multipliers constituting, after integration, two signals each representative of residuals of one of said carrier signals in the output signal of one of said mixers.

5. The estimator claimed in claim 1 wherein said modulator defect is an imbalance and said observed amplitude difference is applied to two multipliers each also receiving one of said modulating signals, the output signals of said multipliers being applied to absolute value circuits before their difference is calculated and then integrated, the integrated signal constituting an imbalance signal.

6. A quadrature modulator cooperating with an estimator as claimed in any one of claims 1 to 5.

7. A defect estimator for a quadrature modulator including two mixers to which two carrier signals are applied and to each of which a modulating signal is applied, output signals of said mixers being applied to a combiner to constitute a modulated signal, said estimator including:

means for detecting a first signal representative of the instantaneous power of said modulated signal;

means for generating a second signal representative of a reference envelope obtained from said modulating signals;

means for subtracting said second signal from said first signal to provide a difference signal; and processing means supplying, from said difference signal, at least one signal relating to said defect.

8. The estimator claimed in claim 7 wherein said modulator defect is a quadrature defect and said processing means include multiplier means for multiplying said difference signal by the signs of said modulating signals, said multiplier means supplying, after integration, a quadrature error signal.

9. The estimator claimed in claim 7 wherein said modulator defect is residual carrier signals in said modulated signal and said processing means include two multipliers each multiplying said difference signal by the sign of one of said modulating signals, the output signals of said multipliers constituting, after integration, two signals each representative of residuals of one of said carrier signals in the output signal of one of said mixers.

10. The estimator claimed in claim 7 wherein said modulator defect is an imbalance and said difference signal is applied to two multipliers each also receiving one of said modulating signals, the output signals of said multipliers being applied to absolute value circuits before their difference is calculated and then integrated, the integrated signal constituting an imbalance signal.

* * * * *